J. H. KELLER.
ROAD MACHINE.
APPLICATION FILED APR. 14, 1910.
1,032,684.
Patented July 16, 1912.
5 SHEETS—SHEET 4.
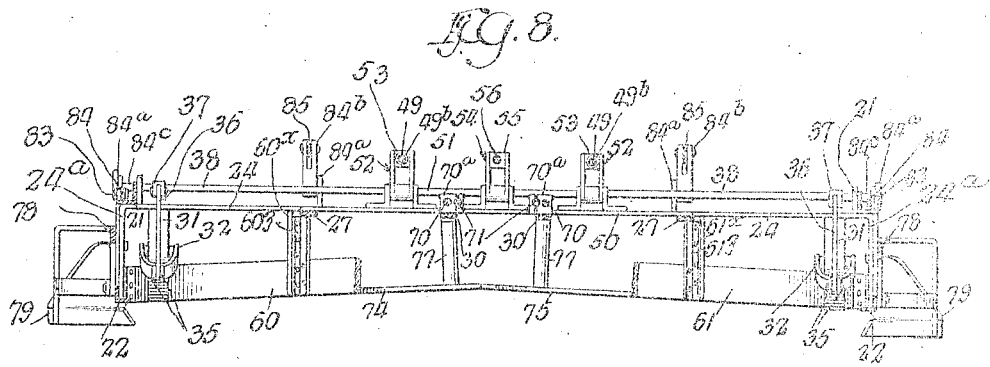
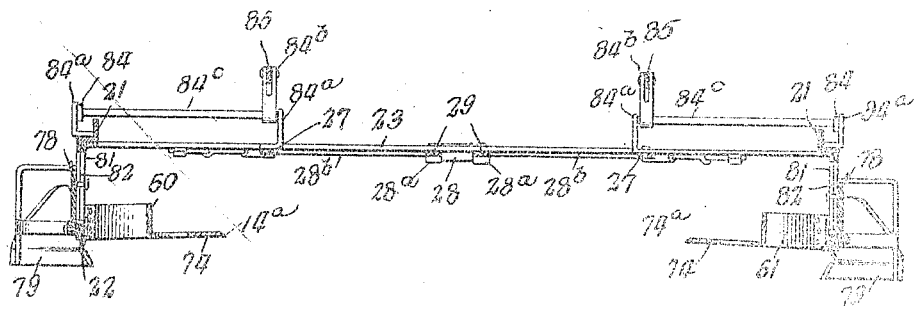
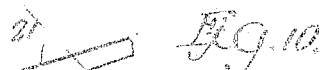
Witnesses:
Inventor
John Henry Keller

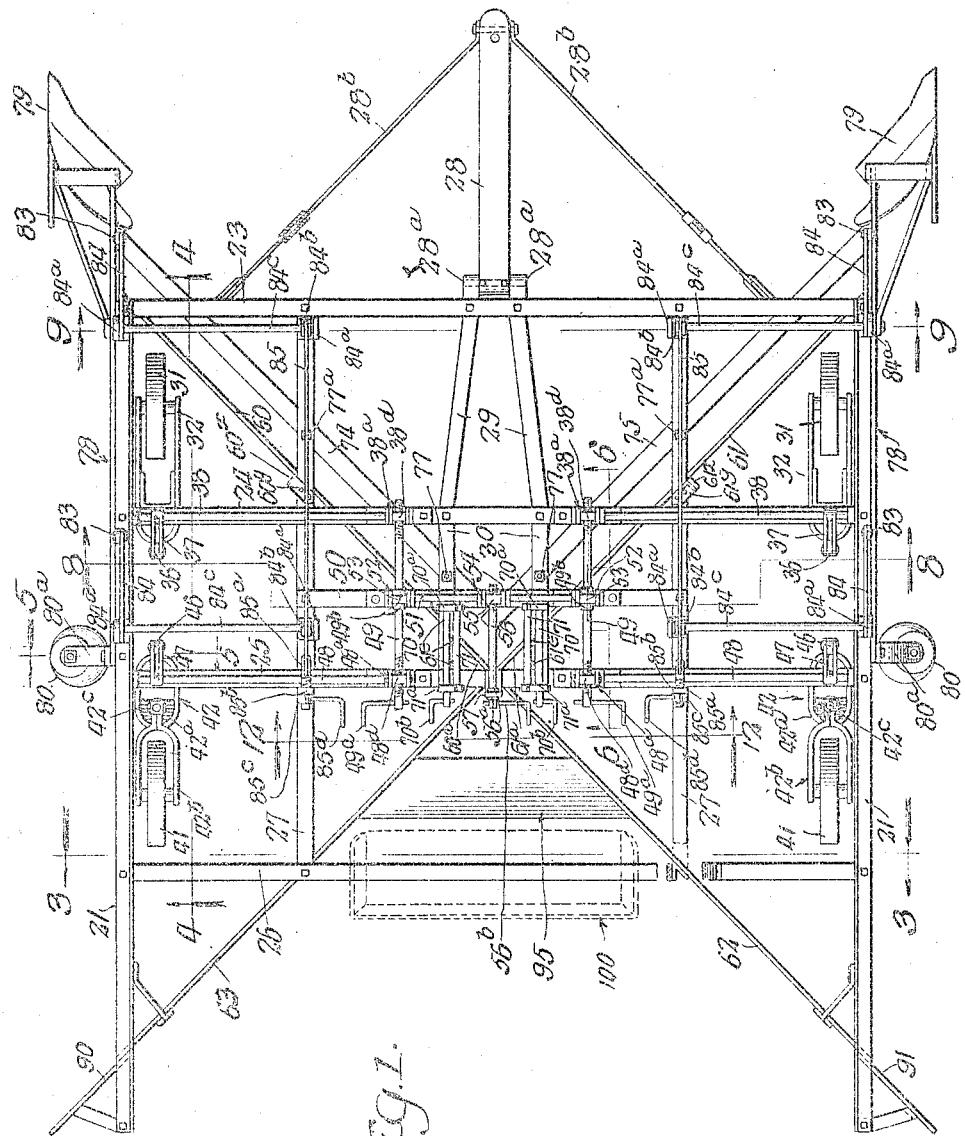

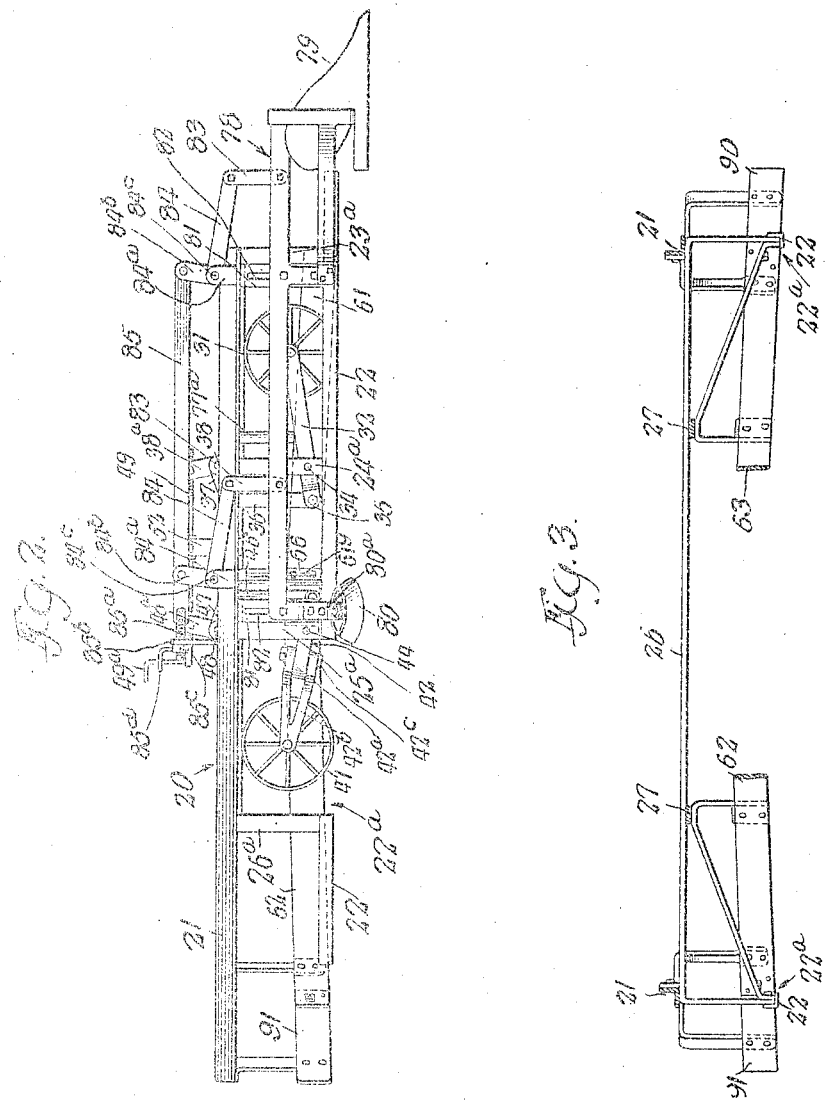

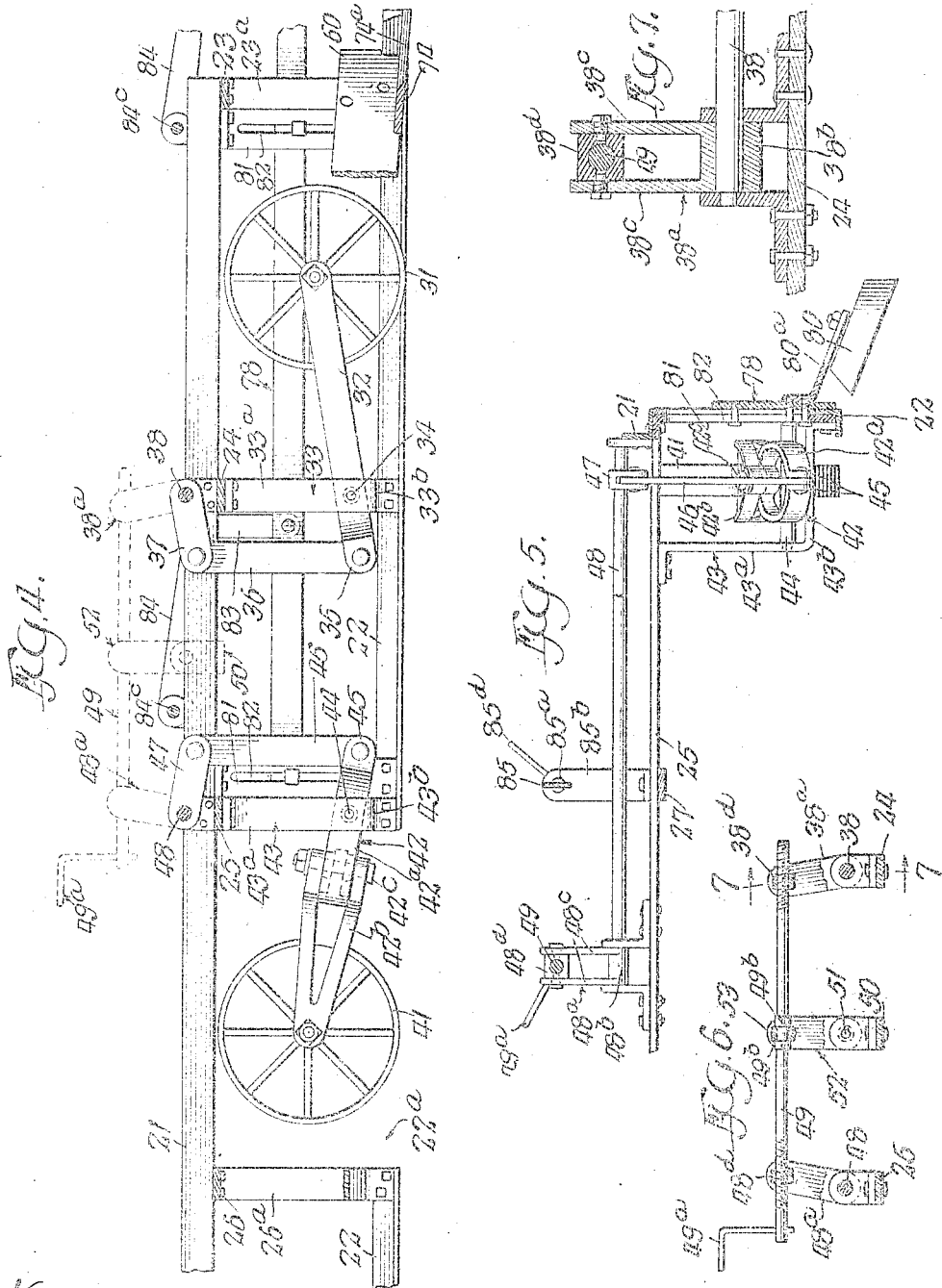

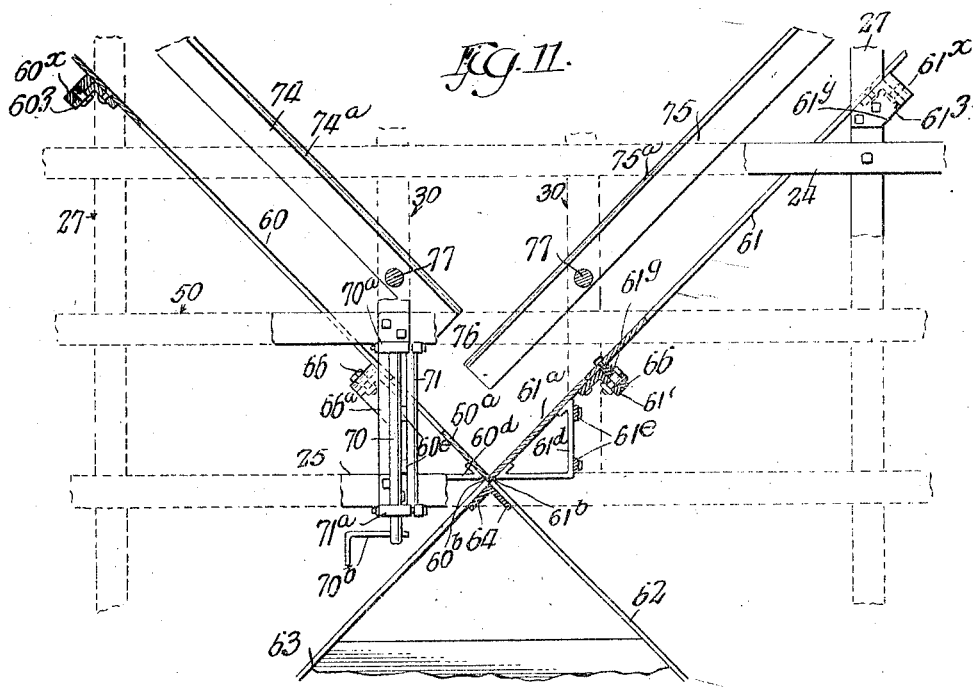

UNITED STATES PATENT OFFICE.

JOHN HENRY KELLER, OF VAN BUREN TOWNSHIP, KEOKUK COUNTY, IOWA.

ROAD-MACHINE.

1,032,684.

Specification of Letters Patent.  Patented July 16, 1912.

Application filed April 14, 1910. Serial No. 555,379.

*To all whom it may concern:*

Be it known that I, JOHN HENRY KELLER, a citizen of the United States, and a resident of Van Buren township, in the county of Keokuk and State of Iowa, have invented certain new and useful Improvements in Road-Machines; and I do hereby declare that the following is a full, clear, and exact description thereof, reference being had to the accompanying drawings, and to the letters of reference marked thereon, which form a part of this specification.

This invention relates to improvements in road machines and consists of the combination of parts hereinafter described and more particularly pointed out in the appended claims.

My improved road machine embraces, in its preferred form, a main frame supported on wheels which are adjustably mounted in the frame so that the front or rear end and either side of the machine may be raised or lowered; a pair of transversely extending cutter bars which are supported flatwise below the frame with their cutting edges directed forwardly and inclined to the line of draft of the machine; a set of grader bars supported edgewise below the frame to the rear of the cutter bars, adapted to receive the earth or other material removed by the cutter bars and work it into the road surface or distribute it at the sides of the roadway; a pair of vertically adjustable plow frames mounted, one on each side of the machine frame, and each carrying a plowshare at its forward end adapted to act in advance of the forward end of the adjacent cutter bar; and mechanism for adjusting the vertical level of the carrying wheels and of the plow frames with reference to the machine frame.

The machine also includes other details which will appear as I proceed with a more particular description.

In the drawings:—Figure 1 is a top plan view of my improved machine. Fig. 2 is a side elevation of the same. Fig. 3 is a vertical section through Fig. 1 on the line 3—3 thereof. Fig. 4 is a partial section through Fig. 1 on the line 4—4 thereof. Fig. 5 is a partial section through Fig. 1 on the line 5—5 thereof. Fig. 6 is a partial vertical section through Fig. 1 on the line 6—6 thereof. Fig. 7 is a transverse section through Fig. 6 on the line 7—7 thereof. Fig. 8 is a transverse vertical section through Fig. 1 on the line 8—8 thereof. Fig. 9 is another transverse section through Fig. 1 on the line 9—9 thereof. Fig. 10 is a detail perspective view showing the manner of attaching the cutter and grader bars at their forward ends. Fig. 11 is a top, partial, plan view showing the grader bars and cutter bars with the upper part of the frame of the machine shown in dotted lines. Fig. 12 is a transverse section through Fig. 1 on the line 12—12 thereof. Fig. $12^a$ is a detail perspective view showing the method of mounting the gates in the forward grader bars. Fig. 13 is a perspective view of one of said gates.

In the drawings, 20 represents the main frame of the machine as a whole. Said frame may be of any convenient construction of the required rigidity and strength to hold the various operating parts down to their work. As illustrated herein, said frame embraces upper and lower longitudinally extending side members in the form of angle bars 21, 21 and 22, 22 and transverse members in the form of flat bars 23, 24, 25, 26 bent downwardly at right angles at their ends to form laterally disposed uprights marked, respectively, $23^a$, $24^a$, $25^a$, $26^a$. The lower ends of said uprights are secured to the vertical webs of the angle bars 22 forming the bottom members of the frame, while the horizontal webs of the upper angle bars 21 rest upon and are secured to the horizontal portions of the bars 23, 24, 25, 26. The upper frame work is additionally braced by means of longitudinally extending bars 27, 27 running parallel to the side members of the frame. A stub tongue 28 is secured by means of ears $28^a$ to the front ends of longitudinal bars 29, bolted to the front bar 23 and to the cross bar 24, and is braced against horizontal swinging movement, by means of tie rods $28^b$, $28^b$ extending from the forward end of said stub tongue to points near each end of the front bar 23. The frame is braced in line with the pull of the tongue by means of longitudinal bars 30, 30 which are bolted to the cross bars 24, 25.

The frame 20 is mounted on four carrying wheels which are adjustable vertically with respect to said frame. The two rear carrying wheels are like caster wheels and are provided with horizontally swinging frames so as to permit them to properly follow the front wheels when the machine is moving about a curve.

31, 31 indicate the front wheels and 41, 41 the rear wheels. The front and rear wheels on each side of the machine are mounted in the same way so that it will be sufficient to describe the construction and arrangement of one front and of one rear wheel. Said construction is best seen in Figs. 1, 4 and 5. The wheel 31 is journaled in a U-shaped frame 32 which embraces the wheel at its open end and is pivotally connected near its closed end to the main frame. 33 indicates an angular bar which has a vertical part $33^a$ secured at its upper end to the cross bar 24 and a horizontal part $33^b$ secured to the vertical upright $24^a$. There is thus formed a rectangular space to receive the closed end of the U-shaped frame 32. The frame 32 is pivoted on a pin 34 which is supported at one end in the vertical part $33^a$ of the angular bar 33 and at the opposite end in the upright $24^a$. At the closed end of the U-shaped frame 32 are formed ears 35 to which is pivoted the lower end of a link 36. The upper end of said link is pivotally connected to an arm 37 which is shrunk upon, or otherwise rigidly secured to, a transversely arranged shaft 38 rotatively supported in suitable standards upon the bar 24. It is apparent that by rotating the shaft 38 the U-shaped frame 32 may be swung up or down upon its pivot pin to raise or lower the wheel 31, thereby adjusting said wheel vertically with reference to the frame of the machine. The rear wheel 41 is mounted in a similar manner, 42 indicating the vertically swinging frame as a whole; 43 an angular bar having a vertical part $43^a$, secured to the cross-bar 25 of the machine, and a horizontal part $43^b$ secured to the upright $25^a$; 44, a pivot pin upon which said frame is pivoted to swing vertically; 45, the ears by means of which said frame is pivotally connected to a link 46, which is pivoted at its upper end to an arm 47, the latter being rigidly secured to a transversely arranged shaft 48 which is rotatably supported by means of suitable standards upon the transverse bar 25. In order to provide for the swinging of the rear wheel 41 in a horizontal plane, the frame 42 is made of two members $42^a$, $42^b$, the one of which, $42^a$, is pivoted on the pin 44 to swing in a vertical plane, while the other member $42^b$, is pivotally connected to the member $42^a$ by means of a pin $42^c$ to swing horizontally. The lower angle bar 22 of the main frame is cut away opposite the wheel 41, as indicated at $22^a$, to permit said wheel to swing outward.

The inner ends of the transversely arranged shafts 38, 48 are provided with forked arms $38^a$, $48^a$ which are alike and which are illustrated on a large scale in Fig. 7. The arm $38^a$ has a socket member $38^b$ which is shrunk upon or otherwise rigidly secured to the shaft 38, and upright laterally separated plates $38^c$. Pivotally hung between the upper ends of said plates $38^c$ is a block $38^d$ which is internally screw-threaded to receive a similarly screw-threaded part of a shaft 49 running longitudinally of the frame. The threads which are formed on the shaft 49 are respectively right and left for the blocks $48^d$, $38^d$, so that a rotation of the shaft 49 will cause the forked arms $38^a$, $49^a$ to swing toward or away from each other,—in the one movement, when said arms are swung toward each other, raising the front and rear wheels 31, 41, and in the other movement, when said arms are swung away from each other, lowering said wheels with respect to the frame. A similar construction is provided for each set of front and rear wheels so that by rotating either of the shafts 49 either side of the machine frame as a whole may be raised or lowered. The shafts 49 are each provided with a crank $49^a$ for rotating them.

I now pass to a description of the construction by means of which the front end of the machine as a whole may be raised or lowered with respect to the rear end. This is done by raising or lowering the two front wheels together and at the same time lowering or raising the two rear wheels together. Between the transverse bars 24, 25 there is located a shorter transverse bar 50 which is secured at its ends, to the longitudinal members 27, 27 of the frame, and intermediate of its ends, to the brace bars 30, 30. Upon the bar 50 is rotatably mounted a transverse shaft 51. Rigidly secured to the opposite ends of said shaft are forked arms 52, 52 which are similar in construction to the forked arms $38^a$, $48^a$ and which carry at their upper ends pivoted blocks 53, 53 in which the shafts 49, 49 have loose bearing at points intermediate of their right and left screw-threaded connections with the blocks $38^d$, $48^d$ carried by the arms $38^a$, $48^a$. Said shafts 49 are provided with collars $49^b$, $49^b$ on each side of said blocks 53 which lock said blocks in longitudinal relation to the shafts. It is apparent that a rotation of the transverse shaft 51 will swing the arms 52, 52 toward the front of the frame or toward the rear of the frame, which will thus bodily move the shafts 49 toward the front or toward the rear of the frame, thereby, in the forward movement of said shafts, lowering the front wheels and raising the rear wheels, or in the rearward movement of said shafts, lowering the rear wheels and raising the front wheels. At the middle of the shaft 51 there is secured to it a third forked arm 54 between the upper forked ends of which is pivoted a block 55 which is screw-threaded to receive the forward end of a longitudinal shaft 56, said shaft 56 being rotatably supported at its rear end in a standard 57 secured to the transverse bar 25 of the frame. Collars $56^a$ $56^a$ are fixed to the shaft on each side of the standard 57 to prevent longitudinal movement thereof. It is apparent that the rotation of this shaft 56, will impart a forward or rearward swing to the arm 54 to raise or lower, respectively, the front and rear wheels. A crank arm $56^b$ is secured to the rear end of said shaft for rotating it.

Passing now to a description of the construction of the cutter and grader bars and of the plow members, by means of which the machine performs its intended function: 60, 61, 62, and 63 indicate four grader bars which are in the form of flat bars arranged edgewise and running diagonally of the machine frame, the bars 60 and 61 extending from the middle of the frame to the forward ends of the lower side frame members and the bars 62 and 63 extending from the middle of the frame to the rear ends of said lower side frame members. The lower working edges of the front and rear bars 60 and 63, located on one side of the frame, are in a plane slightly inclined to the horizontal with their inner ends higher than their outer ends and the lower edges of the grader-bars 61, 62 are similarly arranged in a plane inclined to the horizontal in a direction opposite to the inclination of the plane of the lower edges of the grader-bars 60, 63. The inner ends of the two rear grader-bars 62, 63, are rigidly secured to an upright angle bar 64 which is split and bent at an angle to its vertical axis at its upper end to provide horizontal members 65 by means of which it is secured to the horizontal cross-bar 25. The inner ends of the grader-bars 60, 61 terminate short of the inner ends of the grader-bars 62, 63 to provide room for vertically sliding gates $60^a$, $61^a$ (see Fig. 11). Said grader-bars are suspended near their middle from the longitudinal bars 27 by means of hangers, respectively, $60^x$ $61^x$ (Fig. 8) which have horizontal angular projections $60^y$, $61^y$, at their upper ends bolted to said bars 27. Angle bars $60^z$, $61^z$, are bolted by one web to the hangers $60^x$, $61^x$, and by the other web to the grader-bars 60, 61 thereby rigidly connecting the hangers and grader-bars. A second set of hangers 66 are provided at the extreme inner ends of the grader-bars 60, 61 for the support of the gates $60^a$, $61^a$ (see Figs. 11, 12, $12^a$ and 13). Said hangers are provided at their upper ends with angular horizontal projections $66^a$ which are bolted to the longitudinal bars 30. The vertically movable gates $60^a$, $61^a$ are located in the openings between the inner ends of the grader-bars 60 and 61 and the inner ends of the grader-bars 62, 63. Each of said gates is identical and is illustrated in perspective in Fig. 13. It will be sufficient to describe one of them. The gate $61^a$ comprises a flat plate of the vertical height of the grader-bar 61, provided with a V-shaped edge $61^b$ at its inner end and has bolted to its outer end a vertically arranged angle bar $61^c$. Said angle bar is also bolted to the bar 66 through a slot $61^g$ formed in said bar. This construction permits the gate to be raised above the plane of the lower working edge of the grader-bar. The inner edges of the gates $60^a$, $61^a$, abut against each other and engage within the angle formed by the inner ends of the bars 62, 63.

$61^d$ is an angular bracket secured to the gate $61^a$. To said bracket are bolted vertically extending bars $61^e$, $61^e$. Said uprights extend between parallel longitudinally extending rollers 70, 71, which are supported in standards $70^a$, $71^a$ supported in any convenient manner from the transverse bars 50 and 25. Said rollers have frictional engagement with the uprights $61^e$, $61^e$, so that by the rotation of one of said rollers 70, in contact with said uprights, the gate $61^a$ may be raised or lowered. The roller 70 is operated by means of a crank $70^b$. A similar construction is provided for raising and lowering the gate $60^a$.

74, 75 indicate the cutter-bars which are in the form of flat plates located in the planes, respectively, of the working edges of the grader-bars 60 and 61. They are provided on their forward edges with knife edges $74^a$, $75^a$. The cutter-bar 74 terminates short of the inner end of the cutter-bar 75 in order to leave a space 76 between the inner ends through which may pass the trash, pieces of sod or clods of earth or other material which tend to drag along the cutting edges of the cutter-bars instead of passing over them. Said cutter-bars are secured at their outer forward ends to the lower frame members 22, 22 (see Fig. 10). They are suspended from the frame by means of posts 77, 77, which connect their inner ends to the longitudinal bars 30, 30, and by posts $77^a$, $77^a$ which connect them at points intermediate of their ends to the longitudinal bars 27, 27.

Arranged on each side of the main frame at the forward end thereof are plow frames 78, 78 which carry plows 79, 79, at their forward ends and guide-wheels 80, 80 at their rear ends. Said frames are secured to the main frame by means of bolts and slots so as to permit vertical adjustment of said frame with reference to the main frame.

81, 81 indicate vertical plates (see Fig. 2) provided with slots 82, 82 secured in any convenient manner to the outside faces of the upper and lower members of the main frame. To said vertical bars the auxiliary frames are bolted, the slots permitting vertical adjustment.

Each plow frame is pivotally connected to a pair of vertically extending links 83, 83 which are pivoted at their upper ends to rock arms 84, 84 rigidly secured to the outer ends of transversely extending shafts $84^c$, $84^c$ (Fig. 1) which are journaled in standards $84^a$ supported above the frame. To the inner ends of said shafts are secured rock arms $84^b$, $84^b$. A longitudinally extending bar 85 is pivotally connected to the rock arms $84^b$, $84^b$. Said bar projects beyond the rear one of said arms and there is provided with a screw-threaded shank $85^a$ which passes loosely through a vertical standard $85^b$ secured to the main frame. A nut $85^c$ provided with a crank arm $85^d$ is screw-threaded upon said threaded shank. It is apparent that by turning said crank the upper vertical arms of said bell crank levers may be shifted rearwardly and the plow frame 78 thus raised. Upon a reverse movement of the nut, gravity will cause said frame to descend. By this connection, if the plow strikes a stone or root or other impediment which it cannot pass, it may readily ride over the obstruction, since the screw-threaded shank $85^a$ may pass loosely through the standard $85^b$.

In the example of my invention illustrated herein, the plow members 79 are in the form of ordinary plows, with the land side turned toward the outside of the machine. The inner ends of the cutting edges of the plows extend slightly within the outer edges of the cutter bars. The guide wheels 80 are simply beveled wheels, rotatively secured on angular standards $80^a$ which are bolted to the auxiliary frames 78, with the beveled edges of the wheels tangential on their outer periphery with vertical planes parallel to the line of draft of the machine and touching the land side of the plows.

The rear grader bars 62, 63 extend only to the side limits of the main frame, but I prefer to provide supplemental extensions to said grader bars 90, 91 which are removably secured in any convenient manner to the main frame, so as to project laterally and rearwardly therefrom with the outer ends of said supplemental grader bars in line with the outer edges of the guide wheels 80, and the land side of the plows 79. Both the supplemental grader bars 90, 91 and the auxiliary frames 78 carrying the guide wheels and plows may be readily removed from the main frame to diminish the width thereof in passing across narrow bridges.

A seat 100 for the operator is shown in dotted lines in Fig. 1. This is supported in any convenient manner from the top of the machine frame.

95 is a foot rest secured to the rear grader bars 63, 62 in front of and below the seat 100.

It will be apparent from this description that my improved road machine is capable of cutting a narrow furrow at each side of the main frame, the depth of which may be adjusted above or below the cutting edges of the cutter bars 74, 75, and that the cutter bars themselves will cut or plane off the top surface in two planes inclined to the horizontal from each side of the machine toward its middle. The material which is cut off by the cutter bars and plows will be acted upon by the grader bars; first by the front grader bars, which will try to pass over it and grind it into the road surface, and if this is impossible will pass it through the gates in said front grader bars to the rear grader bars. They in their turn will try to force said material into the road surface, failing in which they will direct it to the side of the roadway and leave it.

Assume a fairly level stretch of ground over which a road is intended to be made, and suppose that it is desired to make a road of a width equal to the width between the land sides of the plows 79, 79. By manipulating the two shafts 49, 49 and the shaft 56, the carrying wheels are adjusted, so that the frame is horizontal and the outer forward edges of the cutter bars just even with the top surface of the ground. Both of the gates $60^a$, $61^a$ are raised by means of the rollers 70, 71 operated by the cranks $71^b$. The auxiliary frames 78, 78 are then adjusted, by turning the cranks $85^d$, to a level a slight distance below the outer forward edges of the cutter bars. The machine is now drawn over the ground by horses or by a traction engine. As it advances, a layer of earth is cut from the surface on each side of the proposed roadway by the plow members 79, 79. The earth or other material, removed by the plow members is thrown in front of the cutting bars and in the continuous advance of the machine passes over or under said cutter bars and comes into contact with the grader bars. The trash or other material which will not pass readily over or under the cutter bars but catches on their edges, will travel toward the middle of the road in contact with said edges, until it comes to the space between the inner ends of said cutter bars, whereupon it will be passed by the cutter bars and left in the middle of the road. Thence it will pass through the gateways 60ª, 61ª and strike the rear grader bars 62, 63 which, if they can not work it into the roadway, will direct it to each side of the roadway, by means of the extensions 90, 91. The grader bars catch the material which passes the cutter bars and either go over it and smooth it over to conform to the final shape of the road or, by reason of their inclined position to the line of draft, direct the excess material which will not pass under them toward the gates 60ª, 61ª. Such clods of earth, sod, trash, stone or other material as passes through these gates is caught by the rear grader bars 62, 63 and is again treated by the rear grader bars in the same way as it has already been treated by the front grader bars. All material which cannot be worked into the road surface by said rear grader bars, finally escapes at the ends of the extensions 90, 91. In this operation of the machine a short, filled slope is formed at each side of the proposed roadway and beyond this a trench or channel from which the earth has been removed by the plow to form said slope. The machine is then caused to travel over the same path again, but this time the frame of the machine is lowered to bring the cutter bars into such position that they will slice or cut a thin layer from the surface at their outer ends. The material gathered in this travel of the machine over the road by both the plow members and by the cutter bars is treated as before, and either passed under the grader bars and ground into the road surface or passed through the gates and out to the action of the rear grader bars which try to conform it to the surface of the roadway and, if it is not susceptible of such use, discharge it at the sides of the road. It is to be noted at this point that where, as in the case supposed, the plows are working below the level of the cutter bars, the material which is not used by the grader bars will be discharged into the trenches at the sides of the roadway, which may thus, if desired, be filled up to the level of the roadway. After the machine has gone over the road this second time, it may be drawn over it a third time, if required, the process being continued or carried forward until the road is finished.

Assume now a road to be made on a stretch of ground which is higher on one side than on the other; in this case the process is the same as in the other except that the earth cut to make the road is removed from only one side of it, the other side of the road being made and built up from the earth removed from the high side of the road. In such case, the gate of the grader bar on the high side of the road is closed so as to direct all of the earth or other material which would not pass under the forward grader bar, to the other lower side of the road. The process is continued as before until the road is brought to the required condition.

The function of the cutter bars is twofold. They partially form the roadway by cutting the side of it down to the desired level, and, at the same time, supply loose earth to be acted upon by the grader bars in filling up low places and in shaping the crown of the road. The coarse material which cannot be used by the grader bars in filling ruts or other low places is rejected and removed to the side of the road. By adjusting the plows below the cutter bars it is possible to obtain fine dirt to be smoothed over the coarser material already spread over the road, which, under the action of the grader bars, forms a smooth, even surface on the road.

The roads made as above described are both of the width of the machine itself. The road machine may also be used, however, to make a road which is greater than its own width, as, for example, one twice its width. In this case the one side of the machine, for example the right hand side, is depressed so as to cut a deep furrow while the other side is raised so as to pass over the material cut by the cutting members. The gate in the right-hand front grader bar is closed while the other gate is left open, just as in making a road over a stretch of ground which is higher on the right side than on the left. As the machine is now advanced over the right hand half of the proposed roadway, the cutter members on the right of the machine remove material which is directed toward the middle of the proposed roadway and there left. The machine is brought back on the left hand side of the roadway and the same result is produced, the earth being cut at the side of the roadway and being delivered toward the middle. The machine is then advanced again over the right hand side of the roadway and this time the cutter members are depressed to a lower level. On this round the grader bars at the left side of the machine receive and act upon the dirt removed by the cutters at the right hand side of the machine and conform it to the final shape of the crown of the road. The machine is brought back over the left hand side of the road in the same way. It will be apparent that in the operation of the machine in this way a road with a high crown at the middle will be formed provided with deep gutters at each side thereof. When making the final trip— over the road, the machine frame may be manipulated so that the left hand grader bars are in a horizontal plane, whereas the right hand grader bars are in a plane sharply inclined below the horizontal, thereby producing a flat crown, or, if a still higher crown is desired, the machine may be manipulated so as to raise the left hand grader bars into a plane inclining upwardly from the horizontal, thereby increasing the inclination of the other grader bars below the horizontal and forming a curved crown. It will be readily apparent that the machine may be adjusted to suit any requirements as to the form of the crown and as to the depth of the gutters provided at each side of the road.

From the description of the machine and of its various adjustments and from this brief description of its operation in making roads on the level and on side slopes, its application to the making of dirt roads under a variety of conditions will be apparent to one familiar with the art of road making. In all cases the earth is cut up by the plow members and by the cutter bars and passed from them to the action of the grader bars which form and finish the road surface. It is also apparent that by adjusting the plow members a road may be made with or without gutters on each side. As, for example, the machine may be used without lowering the cutting edges of the plows below the cutting edges of the cutter bars or, in case the plow members are lowered below said cutter bars in the first instance, the excess earth cut by the cutter bars and plows may be directed into the trenches so as to fill them and level them off with the rest of the road.

While I have described herein one form of apparatus embodying my improvements in road machines, it will be readily apparent that the construction and arrangement of the various parts of the machine as herein described in detail may be modified and changed in various ways and it is to be understood that my invention is not limited thereby except as pointed out in the appended claims.

I claim as my invention:—

1. In a road machine, in combination with a supporting frame, a pair of cutter bars supported flatwise below the frame, said cutter-bars being provided with forwardly directed cutting edges which converge rearwardly from the sides toward the middle of said frame, a pair of forward grader-bars, each of which is parallel to the cutting edge of one of said cutter bars, movable gates located near the inner ends of said forward grader-bars and a pair of rear grader-bars which diverge from the center of said machine rearwardly toward its sides.

2. In a road machine, in combination with a supporting frame, a pair of cutter-bars supported flatwise below the frame, said cutter-bars being provided with forwardly directed cutting edges which converge rearwardly from the sides toward the middle of said frame and are inclined from the sides upwardly toward the middle of said frame, a pair of forward grader-bars arranged edgewise with their lower edges parallel to and located in the same plane with the cutting edges of said cutter bars, movable gates located near the inner ends of said grader-bars and having lower edges which are continuations of the lower edges of said grader-bars, and a pair of rear grader-bars arranged edgewise with their lower edges in the plane of the lower edges of the forward grader-bars, said rear grader-bars diverging from the middle of said frame toward its sides.

3. In a road machine, in combination with a supporting frame, a pair of cutter-bars supported flatwise below the frame, said cutter-bars being provided with forwardly directed cutting edges which converge rearwardly from the sides toward the middle of said frame and which are inclined from the sides upwardly toward the middle of said frame, one of said cutter-bars terminating short of the other cutter-bar at their inner ends, a pair of grader-bars arranged edgewise with their lower edges parallel to and in the same plane with the cutting edges of said cutter-bars, vertically movable gates forming part of said grader-bars near their inner ends, and a rear set of grader-bars arranged edgewise, each with its lower edge in the plane of the lower edge of one of the forward grader-bars, and diverging from the middle of said frame toward its sides.

4. In a road machine, in combination with cutter members adapted to remove the material from the roadway, a pair of grader-bars converging from the side of the road toward the middle thereof, movable gates located at the inner ends of said grader-bars and forming parts thereof, and a rear set of grader-bars diverging from the middle toward the sides of said machine.

5. In a road machine, in combination with forwardly directed cutter-members, a pair of grader-bars adapted to receive the material removed by said cutter members, said forward grader-bar comprising bars arranged edgewise and converging from the sides of said machine toward the middle thereof, and inclined from the sides upwardly toward the middle of said machine, said bars being provided with movable sections at or near their inner ends, and a second set of similar grader-bars diverging from the middle of said machine toward the sides thereof, each of said second set of grader bars having its lower edge in the plane of the lower edge of one of said front grader-bars.

6. In a road machine, in combination with a supporting frame, a pair of cutter-bars arranged flatwise and having forwardly directed cutting edges converging from the sides of said machine toward the middle thereof and inclined upwardly from the sides toward the middle of said machine, grader bars located to the rear of said cutting bars adapted to work upon the material removed by said cutter-bars, and plow members located laterally of said machine and having cutting edges working in advance of said cutter-bars, said plow members being vertically adjustable with reference to said cutter-bars.

7. In a road machine, embracing a main supporting frame, cutter-bars and grader-bars located to the rear of said cutter-bars, plow frames located at each side of said main frame, plows carried by said plow frames, and laterally disposed guide wheels carried at the rear of said plow frames, said plow frames being vertically adjustable with reference to said main frame.

8. In a road machine, in combination with a supporting frame, a pair of cutter-bars supported flatwise below the frame, said cutter-bars being provided with forwardly directed cutting edges which converge rearwardly from the sides toward the middle of said frame and incline upwardly from the sides toward the middle of said frame, a pair of forward grader-bars arranged edgewise with their lower edges parallel to and in the same plane with the cutting edges of said cutter-bars, each of said grader-bars being provided with a vertically movable section at or near its inner end, a pair of rear grader-bars arranged edgewise, each of said rear pair of grader-bars having its lower edge in the plane of the lower edge of the forward grader-bar in advance of it, said rear grader-bar diverging from the middle of said frame toward its sides, laterally disposed plow frames vertically adjustable with reference to said main frame, plows carried by said plow frames with their land sides turned outward and their cutting edges forming extensions of said cutter bars, laterally disposed guide wheels carried at the rear ends of said plow frames, and extensions at the rear ends of said rear grader-bars having ends terminating in a plane passing through the land sides of said plow shares and tangential with the outer periphery of said guide wheels.

9. In a road machine, in combination with a main frame, and cutter-members and grader-members supported by said frame, front and rear wheels, one for each side of the frame, a vertically swinging frame, one for each wheel, in which said wheel is journaled, a rock-shaft for each wheel supported by said main frame, a rock-arm secured to said rock-shaft, mechanism intermediate said rock-arm and the corresponding wheel frame adapted to swing said frames vertically, operating arms secured to each of said shafts, a block pivotally connected to each of said operating arms, and an operating shaft for each pair of side wheels, said shaft having right and left screw-threaded engagement with the pair of pivotally connected blocks corresponding to a front and rear wheel frame.

10. In a road machine, in combination with a main frame and cutter and grader members supported by said frame, front and rear wheels located on each side of the frame, a vertically swinging frame, one for each wheel, in which said wheel is journaled, pivotally mounted on said main frame, a transversely arranged rock-shaft for each wheel frame rotatively mounted on said main frame, a rock-arm secured to each rock-shaft, mechanism intermediate said rock-arm and the corresponding wheel frame adapted to swing said frame vertically, an operating arm secured to each transverse shaft, blocks pivotally secured to said operating arms, a longitudinal shaft for each pair of side wheels having right and left screw-threaded engagement with the blocks carried by the operating arms corresponding to each pair of side wheels, and means for bodily shifting said longitudinal shafts toward the rear or front of the main frame in unison.

11. In a road machine, in combination with a main frame, and cutter members and grader members supported thereby, front and rear wheels located on each side of said main frame, vertically swinging frames, one for each wheel, in which said wheel is journaled, pivotally supported on said main frame, said rear wheel frames each comprising two members hinged at a point intermediate the wheel and the pivotal connection of said wheel frame to the main frame, adapted to permit said wheel to swing in a horizontal plane.

12. In a road-machine provided with a grader-bar having a gateway located therein, a vertically movable gate adapted to close said gateway, vertical guiding means for said gateway including vertical bars, and means for raising and lowering said gate embracing a pair of friction rollers engaging the opposite faces of said vertical bars, and means for rotating one of said rollers.

13. In a road machine, in combination with a main frame, a vertically adjustable plow frame carried by said main frame, a plow secured to said plow frame, and means for vertically adjusting said plow frame with reference to said main frame embracing a rock-shaft, a rock-arm secured to said rock-shaft, a link pivotally connected at one end to said rock-arm and at the other to said plow frame, an operating arm secured to said rock-shaft, an operating bar pivotally connected to said operating arm, a standard, said operating bar having a screw-threaded member extending loosely through an opening in said standard, and a nut screwed upon said screw-threaded member in engagement with said standard.

In testimony that I claim the foregoing as my invention I affix my signature in the presence of two witnesses, this eighth day of April, A. D. 1910.

JOHN HENRY KELLER.

Witnesses:
 LEW MAHANNAH,
 H. M. PRICE.